United States Patent
Betzler et al.

(10) Patent No.: US 12,031,571 B2
(45) Date of Patent: Jul. 9, 2024

(54) ANCHOR DEVICE WITH SNAP MECHANISM

(71) Applicant: RUD KETTEN RIEGER & DIETZ GMBH U. CO. KG, Aalen (DE)

(72) Inventors: Michael Betzler, Abtsgmünd (DE); Simon Haas, Göggingen-Horn (DE)

(73) Assignee: RUD KETTEN RIEGER & DIETZ GMBH U. CO. KG, Aalen (DE)

( * ) Notice: Subject to any disclaimer, the term of this patent is extended or adjusted under 35 U.S.C. 154(b) by 752 days.

(21) Appl. No.: 17/268,626

(22) PCT Filed: Jul. 30, 2019

(86) PCT No.: PCT/EP2019/070410
§ 371 (c)(1),
(2) Date: Feb. 16, 2021

(87) PCT Pub. No.: WO2020/035299
PCT Pub. Date: Feb. 20, 2020

(65) Prior Publication Data
US 2021/0355987 A1    Nov. 18, 2021

(30) Foreign Application Priority Data
Aug. 16, 2018  (DE) .................. 10 2018 213 827.3

(51) Int. Cl.
*F16C 11/10*  (2006.01)
*B60P 7/08*   (2006.01)
*B66C 1/66*   (2006.01)

(52) U.S. Cl.
CPC ............ *F16C 11/10* (2013.01); *B60P 7/0807* (2013.01); *B66C 1/66* (2013.01)

(58) Field of Classification Search
CPC .......... F16C 11/10; B60P 7/0807; B66C 1/66; F16G 15/08
See application file for complete search history.

(56) References Cited

U.S. PATENT DOCUMENTS 4,671,554 A * 6/1987 Lancelot ................. B66C 1/666
                                                    294/90
5,961,241 A * 10/1999 Haker ....................... B66C 1/66
                                                    403/155

(Continued)

FOREIGN PATENT DOCUMENTS

AT   412269 B   12/2004
DE   3301960 C2  8/1984

(Continued)

OTHER PUBLICATIONS

Notification of First Office Action from the China National Intellectual Property Administration for Chinese Patent Application No. 201980053466.9 dated Feb. 3, 2023, with English translation, 11 pages.

(Continued)

*Primary Examiner* — Stephen A Vu
(74) *Attorney, Agent, or Firm* — Edell, Shapiro & Finnan, LLC

(57) ABSTRACT

An anchor device (1) with a base part (2) for attachment to an object (10), such as a load or a loading surface. The anchor device (1) has a connecting part (6) which is held on the base part (2) and can be pivoted relative to the base part about a swivel axis (4). The base part (2) has a bearing surface (8) for contact with the object. A snap mechanism (29), which has at least one snap position (30) along a pivoting movement (28) of the connecting part about the swivel axis, is provided. The snap mechanism generates a braking force (32) in the direction of the pivoting movement in front of the snap position which is reduced in the direction of the pivoting movement behind the snap position.

19 Claims, 3 Drawing Sheets

(56) References Cited

U.S. PATENT DOCUMENTS

| | | | | |
|---|---|---|---|---|
| 6,032,993 | A | * | 3/2000 | Kwon .................. B66C 1/66 294/215 |
| 6,547,474 | B1 | * | 4/2003 | Smetz .................. B66C 1/66 403/150 |
| 7,036,858 | B2 | * | 5/2006 | Buck ................... B66C 1/66 294/215 |
| 2010/0266333 | A1 | | 10/2010 | Oswald et al. |

FOREIGN PATENT DOCUMENTS

| | | |
|---|---|---|
| DE | 10005717 A1 | 8/2001 |
| DE | 10228046 A1 | 2/2004 |
| DE | 202004003237 U1 | 5/2004 |
| DE | 202012103405 U1 | 12/2013 |
| EP | 1754629 A2 | 2/2007 |
| EP | 1840070 A2 | 10/2007 |
| WO | 2012152911 A1 | 11/2012 |
| WO | 2017125492 A1 | 7/2017 |

OTHER PUBLICATIONS

Search Report for DE 102018213827.3 dated Mar. 21, 2019, 9 pages.
Office Action for EP 19752126.3 dated Mar. 31, 2022, 4 pages.
Notification of Second Office Action from the China National Intellectual Property Administration for Chinese Patent Application No. 201980053466.9 dated Sep. 22, 2023, with English translation, 8 pages.
Examination Report from the European Patent Office for European Patent Application No. 19752126.3 dated Sep. 26, 2023, with machine translation, 8 pages.
International Search Report for International Application No. PCT/EP2019/070410 dated Nov. 12, 2019, 4 pages.

* cited by examiner

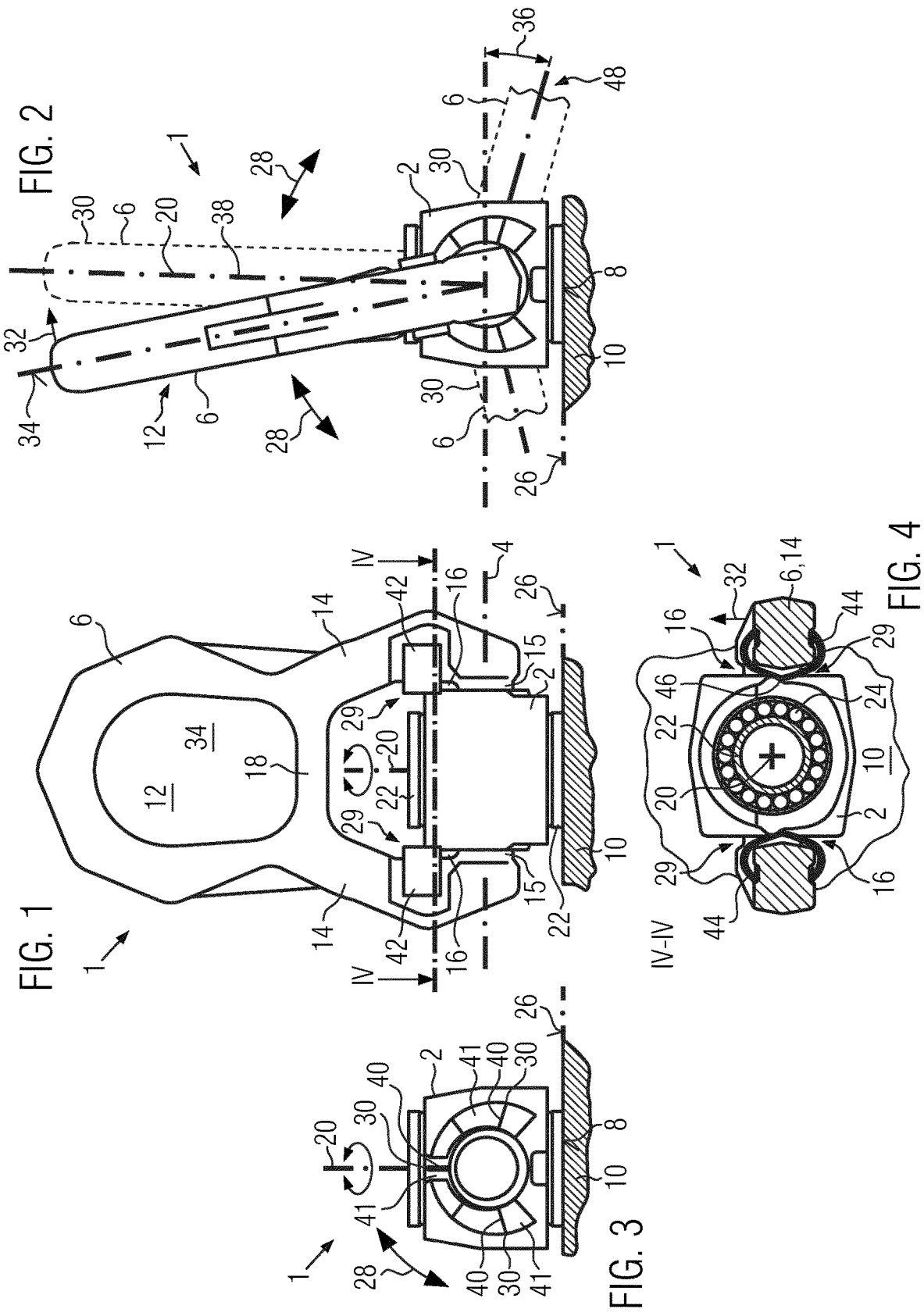

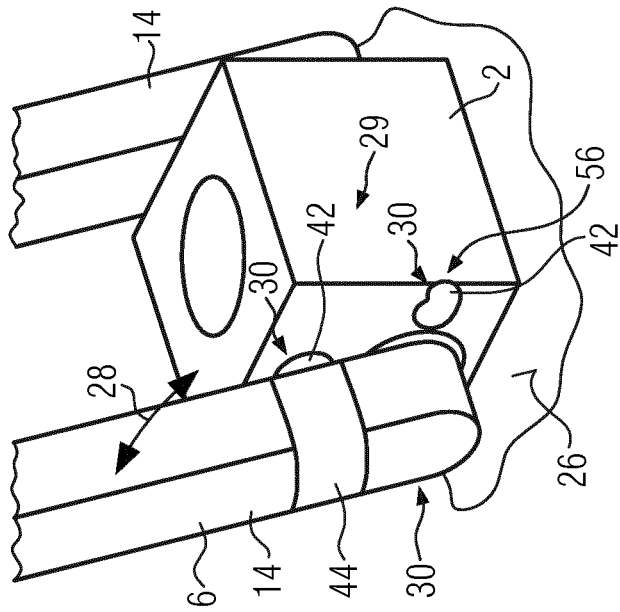
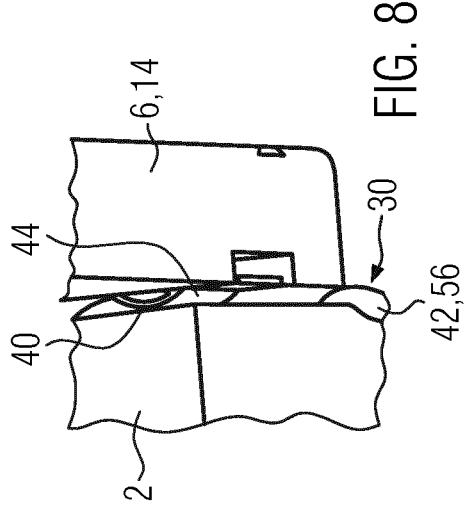
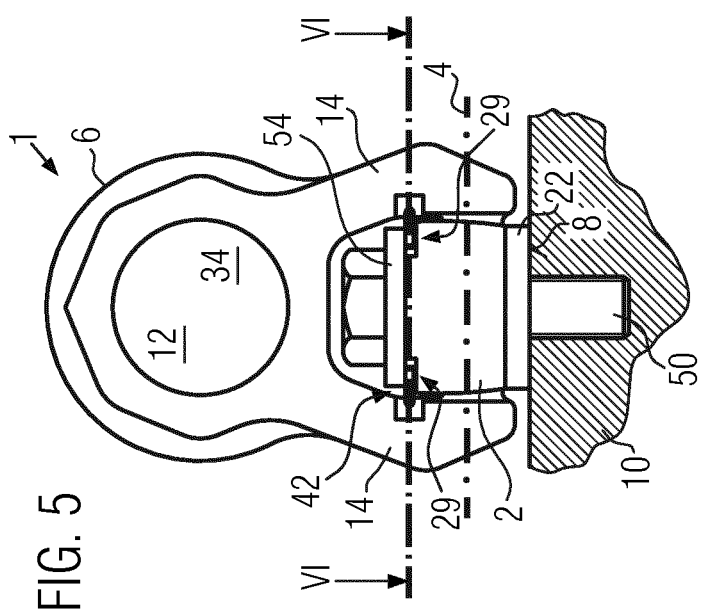
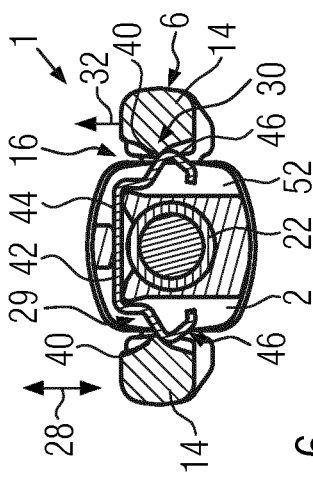

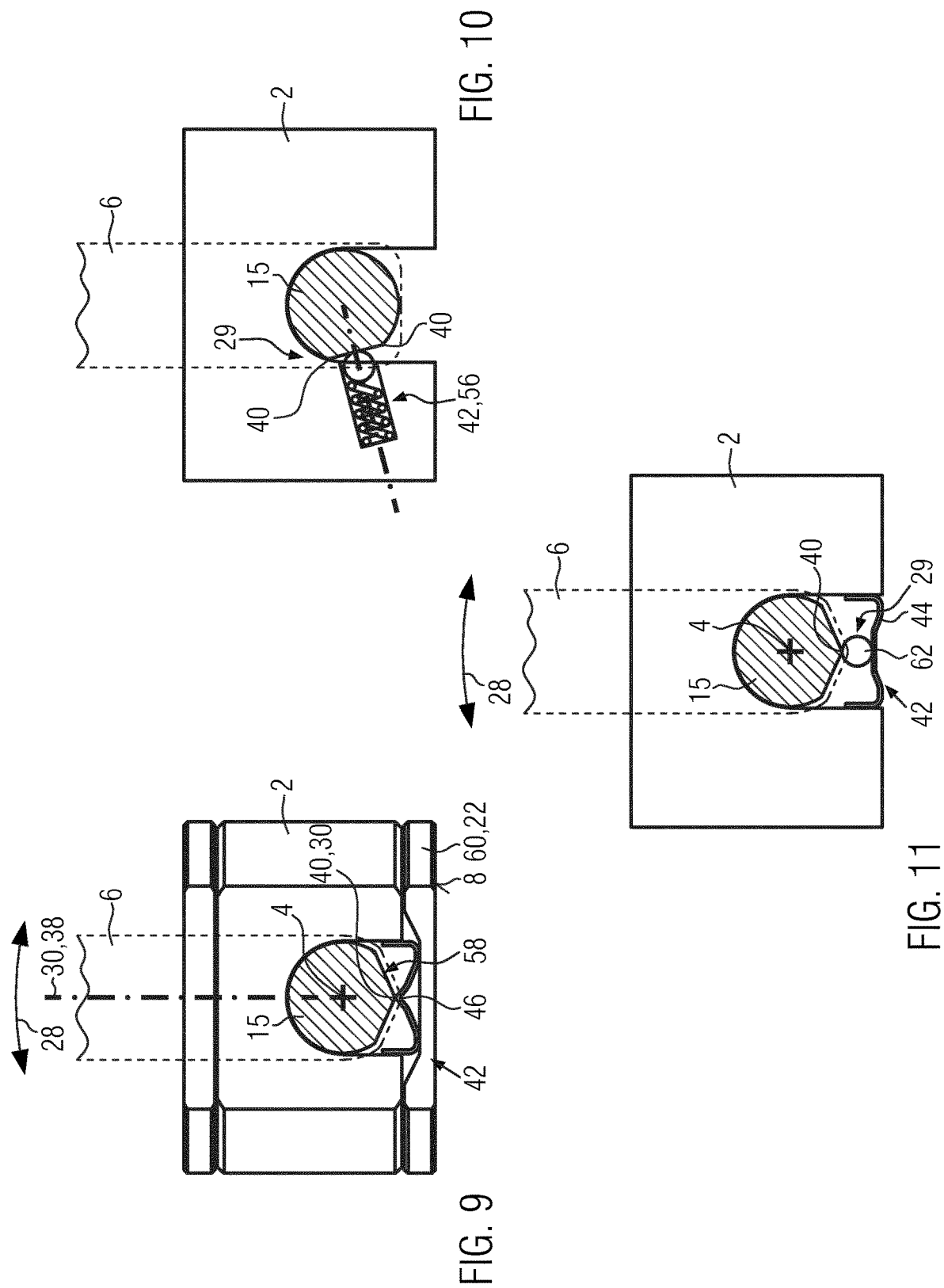

ANCHOR DEVICE WITH SNAP MECHANISM

CROSS-REFERENCE TO RELATED APPLICATIONS

This application is a National Stage Application Under 35 U.S.C. 371 of PCT Patent Application No. PCT/EP2019/070410, filed Jul. 30, 2019, which claims priority to and the benefit of German Patent Application No. 102018213827.3, filed Aug. 16, 2018.

FIELD OF THE INVENTION

The invention refers to an anchor device or stop device with a base part for attachment to an object, such as a load or a loading surface, and with a connecting part held on the base part pivotably relative to the base part about a swivel axis, the base part having a bearing surface for bearing against the object and the connecting part having an opening for fastening of a fastening, lifting, lashing or tensioning means.

BACKGROUND OF THE INVENTION

Such anchor devices are well known. A problem with such anchor devices is that the connecting part turns over under load. Such a turning over may occur if a load is applied to the anchor device in a direction which is not permissible. If, for example, the anchor device is loaded transversely to the plane of the opening when the connecting part is stationary, it may be possible that the bracket will pivot with a delay, under already high load; the bracket will turn over. The turn-over produces load peaks which can damage the object, the anchor device and/or the fastening, lifting, lashing and tensioning means.

The invention is therefore based on the object of creating an anchor device in which this risk is reduced.

SUMMARY OF THE INVENTION

This object is solved according to the invention for the anchor device mentioned above by providing a snap mechanism which has at least one snap position along a pivoting movement of the connecting part about the swivel axis and which in the direction of the pivoting movement in front of the snap position generates a braking force directed against the pivoting movement, which is reduced in the direction of the pivoting movement behind the snap position.

A snap mechanism designed in this way prevents the connecting part from assuming a position at the snap position on its own. The snap mechanism thus rejects the connecting part from the snap position. Thus, the dangerous turn-over of the connecting part cannot take place at the snap position.

The invention described above can be further improved by the following features, each of which being advantageous on its own and combinable with one another in any way.

Thus, in accordance with an advantageous design of the anchor device, the base part can be pivoted about an axis of rotation, in particular about a part forming the bearing surface, such as an inner bush. The axis of rotation provided in addition to the swivel axis further improves the self-alignment of the connecting part in the direction of the load acting on the connecting part. It is advantageous that the axis of rotation is perpendicular to the swivel axis or perpendicular to the bearing surface. In such a case, the bearing surface is formed by an element which is rotatable relative to the base part, for example the inner bush.

The braking force can be reduced continuously or discontinuously with the movement of the connecting part over the snap position. For example, the braking force can decrease continuously over at least one range of the pivoting movement as the snap position is exceeded and the distance between the connecting part and the snap position increases. In another configuration, the sign of the braking force can change when the snap position is exceeded, i.e. the braking force behind the snap position is directed in the direction of the pivoting movement. According to another variant, the braking force can drop abruptly behind the snap position, e.g. be equal to or close to zero. The variants mentioned above can also be combined with each other as desired. For example, if the snap position is exceeded, the braking force can first change its sign and then return to zero or a value close to zero.

The braking force preferably also has a restoring force. The restoring force generates a restoring torque directed against the pivoting movement. Furthermore, the braking force can have a friction force as a component, whereby the friction force is generated by friction. When the connecting part is stationary, the braking force serves as a holding force to fix the connecting part in its position.

A particularly advantageous configuration is achieved when the connecting part at the snap position is essentially perpendicular to the bearing surface. With such an arrangement of the snap position, the turning over of a connecting part aligned perpendicular to the bearing surface can be prevented.

According to a further advantageous configuration, the snap mechanism may have at least one base part side portion and at least one connecting part side portion, which preferentially cooperate to produce the snap process.

In order not to build larger than conventional anchor devices without a snap mechanism, the snap mechanism is preferably located at least partially in at least one gap between the connecting part and the base part. Such a gap can, for example, be formed between one leg of the connecting part and the base part. With such a design, the base part can be located in particular between the two legs so that there are two gaps. In the case of two gaps, the snap mechanism can be in two parts, with one part arranged in each of the two gaps. The parts of the snap mechanism located in the two gaps may be symmetrical in relation to one another, for example symmetrical in relation to a central plane of the anchor device, the central plane being in particular perpendicular to the swivel axis, or rotationally symmetrical, in particular rotationally symmetrical in relation to the axis of rotation.

In order to reliably reject the connecting part from the snap position, the braking force and/or restoring force directed against the pivoting movement can increase at least in one section in front of the snap position with decreasing distance from the snap position in accordance with a further advantageous design. The closer the connecting part approaches the snap position, the greater the drive force required to move the connecting part in the direction of the snap position. This makes it harder for the connecting part to reach the snap position.

According to another advantageous design, the snap mechanism can comprise at least one spring arrangement, which is more elastically deformed closer to or directly at the snap position than at a distance from the snap position in the pivoting direction. The spring arrangement may in particular be designed to allow a snap action and to generate the braking force due to the elastic deformation.

The spring arrangement can be located on the base part, i.e. on the base part side. However, it can also be located on the connecting part, i.e. on the connecting part side. The spring arrangement may also extend, at least in sections, into a gap between the base part and the connecting part. If several spring arrangements are provided, there can be at least one spring arrangement on the base part and at least one spring arrangement on the connecting part according to a further development. The snap mechanism can have several spring arrangements.

The spring arrangement may have at least one spring, which, in particular in the case of an arrangement on the base part side, at least partially encompasses the base part or, in particular in the case of an arrangement on the connecting part side, at least partially encompasses the connecting part. Due to the encompassment the spring can be fastened without weakening the structure of the respective part. The spring can be designed as a yoke spring or a spring clip.

Alternatively, the spring arrangement may have a resilient pressure piece, such as a ball pressure pin, a spring bolt, or a locking pin inserted into an opening.

The spring can at least be deformed at the snap position, preferably also in front of and/or behind the snap position in the direction parallel to the pivoting movement, in order to generate the restoring force. Alternatively or additionally, the spring can be deformed perpendicular to the pivoting movement in order, for example, to generate a friction force that is generated against the pivoting movement. To generate the friction force, the elastically deformed spring arrangement presses against an opposite friction surface.

The spring arrangement can have a section projecting away from the base part towards the connecting part, for example in the case of a base part side arrangement, or a section projecting away from the connecting part towards the base part, for example in the case of a connecting part side arrangement. The projecting section can interact with the connecting part at least at the snap position if the base part is arranged on the side of the base part. If the connecting part is arranged on the connecting part side, the projecting section can interact with the base part at least at the snap position.

The projecting section can be part of the spring, for example a projection formed by the spring. Alternatively, the projecting section may be formed by a resiliently held body located between the base part side spring arrangement and the connecting part or the connecting part side spring arrangement and the base part. In the case of a ball pressure pin, for example, the body held resiliently in this way is a ball, in the case of a locking pin a pin.

In the case of a spring which encompasses the base part by at least 180°, there may be two diametrically opposed projecting sections. For example, a spring encompassing the base part may have two opposite projecting sections opposite the legs of the connecting part extending away from the swivel axis.

To effect the snap action, the snap mechanism may have at least one latching or locking projection facing the spring arrangement at least at the at least one snap position. At the at least one snap position, the latching projection cooperates with the spring arrangement, for example in that at the snap position the spring arrangement snaps over the latching projection in the course of the pivoting movement. The latching projection can be part of a friction surface against which the resiliently deformed spring arrangement rests at least in sections along the pivoting movement in order to generate the friction force.

Depending on whether the spring arrangement is arranged on the connecting part or on the base part, the at least one latching projection can be located opposite on the base part or connecting part. Preferably, the latching projection jumps forward from the connecting part in the direction parallel to the swivel axis or perpendicular to the swivel axis towards the base part when the spring arrangement is on the base part, or from the base part towards the connecting part when the spring arrangement is on the connecting part. The latching projection can project in particular into the gap between the connecting part and the base part.

In certain applications, it may be desirable for several spaced snap positions to be located along the pivoting movement. In order to achieve this, a number of latching projections can be arranged around the swivel axis according to a further design. Preferably, the majority of latching projections work together with a single spring arrangement to keep the design effort low.

According to a further variant, the latching projections can also project radially away from an axis or stub shaft of the connecting part or radially inwards towards the connecting part or its axis or stub shaft in relation to the swivel axis. In such a configuration, the latching projections interact with a spring arrangement that is also radially aligned, i.e. perpendicular to the swivel axis.

The snap process preferably occurs when two projections move past each other to the snap position with elastic deflection of at least one of the two projections. When snapping, the latching projection and the projecting section of the spring arrangement lie against each other at at least one snap position, deflecting at least the spring arrangement.

The latching projection can also be elastically deflectable. It does not necessarily have to be made of solid or rigid material. For example, the latching projection can be formed by a spring or a spring-mounted body.

If at least one further snap position is provided along the pivoting movement, the connecting part is preferably aligned at an acute angle or at least approximately parallel to the bearing surface at the at least one further snap position. With such a design, a snap position or a pair of snap positions can be used to fix the connecting part in a specific position. For example, the connecting part can be latched between a snap position and the bearing surface in order to create a safe non-use position. In another design, the connecting part can be latched between two latching projections adjacent in the pivoting direction. In a different configuration, the connecting part may be held at a distance from the bearing surface to facilitate manual gripping of the connecting part or the fastening of a fastening, lifting, lashing or tensioning device.

Finally, a snap position can also be used as a bracket fall brake, since the braking force brakes the fall of the connecting part when the connecting part moves towards the snap position. If the braking force at one position is equal to or greater than the dead weight of the connecting part, the connecting part is held at this position.

A friction force directed against the pivoting movement can be generated on at least one flank of the latching projection, for example by friction between the elastically deformed spring arrangement and the flank. If the movement is stopped because the braking force is equal to or greater than the driving force of the pivoting movement, the braking force can be used as a holding force to hold the connecting part in the position where the pivoting movement was stopped. The exact position of this breakpoint on the flank of the latching projection depends on the magnitude of the force driving the pivoting movement. A breakpoint can be located on one side of the snap position. A restoring force can also be generated by deflecting the spring arrangement parallel to the pivoting direction and/or by a flank running outside the friction cone.

The course of the braking, holding and/or restoring force along the pivoting movement can be influenced by the shape of the flanks of the latching projection and its height. A high latching projection, which in particular generates a strong deflection of the spring arrangement or the spring, generates a high braking force. Steep flanks lead to a strongly increasing force towards the snap position or, after exceeding the snap position, back to a rapidly decreasing force. A less steep flank generates a less rapidly rising or—behind the snap position—falling force. The course of the braking force can be adapted to the respective requirements by progressively or degressively rising flanks.

Preferably, the flanks of the latching projection at the snap position, which interacts with the connecting part aligned at or closer to the perpendicular to the bearing surface are steeper than at at least one other snap position, which is located closer to the bearing surface or mounting plane along the pivoting movement. The steeper flanks produce a more precisely defined snap position, while the less steep flanks produce a gradual increase in the braking, holding and/or restoring force.

In the following, the invention is explained in more detail with reference to the drawings on the basis of different embodiments. For the sake of simplicity, the same reference numerals are used in the drawings for elements which correspond in function and/or structure.

In accordance with the above embodiments, the features described for an embodiment can be changed. Thus, a feature of an embodiment can be dispensed with whose technical effect is irrelevant for a particular application. Conversely, a feature can be added to an embodiment, for example a feature of another embodiment or a feature described above, if the technical effect of this feature is important for a particular application.

BRIEF DESCRIPTION OF THE DRAWINGS

FIG. 1 shows a schematic front view of an anchor device according to the invention;

FIG. 2 shows a schematic side view of the anchor device of FIG. 1;

FIG. 3 shows a schematic side view of a base part of the anchor device of FIG. 1;

FIG. 4 shows a section along the line IV-IV of FIG. 1

FIG. 5 shows a schematic representation of another anchor device;

FIG. 6 shows a schematic sectional view along the line VI-VI of FIG. 5;

FIG. 7 shows a schematic representation of another anchor device;

FIG. 8 shows a schematic representation of a detail of FIG. 7;

FIG. 9 shows a schematic sectional view of another anchor device;

FIG. 10 shows a schematic sectional view of another anchor device;

FIG. 11 shows a schematic sectional view of another anchor device.

First of all, the construction and functions of the anchor device 1 according to the invention are explained with reference to the embodiment in FIGS. 1 and 4.

The anchor device 1 has a base part 2 and a connecting part 6 which can be pivoted about a swivel axis 4 relative to the base part 2 and is attached to the base part 2.

The base part 2 has a bearing surface 8, which serves to rest on an object 10, for example a load or a loading area.

The connecting part 6 has an opening 12, which is used to attach a fastening, lashing, lifting or tensioning device that is not shown. For example, a hook, a carabiner, a shackle, a rope and/or a belt can be hooked into opening 12. The connecting part 6 is at least approximately bracket-shaped and has two legs 14, which extend away from the swivel axis 4 and from the base part 2. The legs 14 are opposite each other with regard to the base part 2, so that the base part 2 is between the legs. At the base part side end of each leg 14 there is an axle or an axle stub 15 which extends coaxially to the swivel axis 4 into the base part 2.

DETAILED DESCRIPTION OF THE INVENTION

A gap 16 is formed between the base part 2 and the connecting part 6. The opening 12 may be separated from the base part 2 by a strut 18 which extends from one leg 14 to the other leg 14, preferably parallel to the swivel axis 4.

The base part 2 can be rotatable relative to the object 10 about an axis of rotation 20, so that the connecting part 1 can align itself along a force applied by the fastening, lifting, lashing or tensioning means by pivoting the swivel axis 4 and turning it about the axis of rotation 20. In order to ensure rotation with respect to the object 10, the bearing surface 8 may, for example, be formed by a bush 22 which is rotatable relative to the base part 2 and which passes through the base part at least in sections in the direction of the axis of rotation 20. Between the bush 22 and base part 2 there is a pivot bearing 24, for example a roller bearing or plain bearing. The bush 22 preferably protrudes on the side of base part 2 facing away from connecting part 6.

A mounting plane 26 defined by the bearing surface 8 is preferably parallel to the swivel axis 4 and/or perpendicular to the axis of rotation 20. The axis of rotation 20 is preferably perpendicular to the swivel axis 4 and can in particular intersect the swivel axis 4.

The pivoting movement of the connecting part 6 about the swivel axis 4 is shown by the double arrows 28.

The anchor device 1 is provided with a snap mechanism 29 which has at least one snap position 30, preferably a plurality of snap positions 30, along the pivoting movement 28 of the connecting part 6 about the swivel axis 4. A snap action takes place at a snap position. In the course of the snap action, the snap mechanism 29 generates a braking force 32 along the pivoting movement 28 of the connecting part about the swivel axis 4 in front of the snap position 30, which is directed against the pivoting movement 28 and which is reduced in the direction of the pivoting movement 28 behind the snap position 30. The reduction in braking force 32 at the snap position can be continuous or, preferably, discontinuous or stepwise. In the course of the reduction, the braking force 32 can be directed in the direction of the pivoting movement 28 behind the snap position 30 in the direction of the pivoting movement 28, so that a sign reversal takes place at the snap position. Alternatively, the braking force can drop abruptly behind the snap position 30, for example to at least approximately zero.

Preferably, the snap position 30 is located at a position in which the connecting part 6 is aligned at least approximately perpendicular to the mounting plane 26. For example, an opening plane 34 determined by opening 12, which can be a compensation plane if opening 12 is not planar, can run parallel to or through the axis of rotation 20. Further snap positions 30 can be arranged in such a way that an acute angle 36 is enclosed between connecting part 6 located at the other snap position 30 and the mounting plane 8 and/or connecting part 6 runs parallel to the mounting plane 26. For example, there may be snap positions 30 at at least one angle of approximately 60°, 45°, 30°, 0° and/or −5° to −30° to the mounting plane. Preferably, the snap positions 30 are symmetrical to both sides of the vertical 38 on the mounting plane 26.

To create the snap positions 30, the snap mechanism 29 of the embodiments of FIGS. 1 to 4 has a latching projection 40 at each snap position 30. The flanks 41 of a latching projection 40 can extend differently steep. Likewise, different latching projections can have flanks of different steepness. The heights of the latching projections 40 can also be different. In the embodiment of FIGS. 1 to 4, the latching projections 40 are located on the base part 2 and project in gap 16 to the opposite connecting part 6 or the opposite leg 14.

The snap mechanism 29 further comprises at least one spring arrangement 42 which cooperates with the at least one latching projection 40 at least to the snap position. In the embodiment shown, the spring arrangement 42 is located on the connecting part 6. The spring arrangement 42 therefore moves with connecting part 6 along the pivoting movement 28. The latching projections 40 are arranged around the swivel axis 4, preferably at the same distance from the swivel axis 4, so that in the course of the pivoting movement 28, the spring arrangement 42 sweeps the latching projections 40 one after the other.

As shown, on each leg 14 there can be a spring arrangement 42 projecting into the gap 16 to the base part 2.

The spring arrangement 42 can have at least one spring 44 which is deflected at at least one snap position 30. The spring 44 can at least partially encompass the connecting part 6, in particular a leg 14, for example by being designed as a yoke or clamping spring. A projection 46 of the spring 44 can interact directly with the latching projections 40 by snapping over the latching projections 40 at a snap position 30.

In the course of the pivoting movement 28, the spring arrangement 42 is increasingly deflected by the flanks 41 as it approaches the snap position 30, so that a deflection or braking force 32 is generated which is directed counter to the pivoting movement 28. The rate at which the braking force 32 per angular unit of the pivoting movement 28 builds up is determined by the steepness of the flanks 41. A flat flank 41 builds up the braking force 32 over a larger section of the pivoting movement 28 than a steep flank. The height of the braking force 32 is determined by the height of the latching projection 30. The higher the latching projection 30 is, the higher the braking force. A friction force and/or restoring force can be generated by the latching projection 30 and its flanks 41, both of which are part of the braking force. The restoring force differs from the friction force in that it not only brakes the pivoting movement but also generates a restoring torque directed against the pivoting movement. The frictional force, on the other hand, only slows down the pivoting movement. The restoring force can be generated by deforming the spring arrangement parallel to the pivoting movement and/or by deflecting the friction force on a flank outside the friction cone.

In the design shown, the snap mechanism 29 is preferably used at the same time as a bracket fall brake, which can hold the connecting part 6 at a distance from the mounting plane 26 at least under its own weight. This is done by the fact that the latching projection 40 at the at least corresponding snap position is sufficiently high to slow down the falling of the connecting part 6 under the effect of gravity and to stop it before reaching the mounting plane 8 and before snapping over the snap position 30.

To avoid springback, the flank 41, which increasingly deflects the spring arrangement 42 along the pivoting movement 28 towards the mounting plane 26, may be less inclined than, for example, the other flank 41, which is located between the latching projection 40 and the mounting plane 26. This results in a gradual increase in the braking force, while the steep flanks create a defined transition point when the connecting part is aligned vertically, which has little effect on the rest of the movement of the connecting part around the vertical.

The other snap positions 30, where the connecting part is parallel or at an acute angle 36 to the mounting plane 26, can also be used to latch the connecting part, for example, into a non-use position 48, in which the bracket is in contact with mounting plane 26 or object 10 and is latched in this position by the snap position 30.

Next, the embodiment of FIGS. 5 and 6 is described, whereby for simplicity's sake only the differences to the previous embodiment are dealt with.

For example, the embodiment in FIG. 5 shows a fastener 50 with which the anchor device 1 can be fastened to the object 10. The fastener 50, for example, is a screw bolt inserted through the bush 22.

In the embodiment of FIGS. 5 and 6, the spring arrangement 42 is located on the base part 2. The spring 44 is of bracket-shaped design and has a spring projection 46 at two positions opposite the connecting part 6, which interacts with a latching projection 40 on the leg side or connecting part side. The spring 44 is essentially U-shaped, with the spring projection 46 formed on the two legs. The spring arrangement 42 embraces the base part 2 at least in sections. It is held captive at the base part, for example by holding it in a pocket 52 of the base part, which can be closed from above by an upper part 54 of the bush.

In this embodiment, there is only one single snap position 30 with the connecting part 6 or the opening 12 or the opening plane 34 aligned perpendicular to the bearing surface 8.

At the snap position, the two latching projections 40 on the connecting part side snap in the course of the pivoting movement 28 via the spring arrangement 42 or the projections 46 of the spring 44.

By deforming the spring before reaching the snap position 30, a braking force 32 is generated before reaching the snap position 30. After exceeding the snap position 30 the spring 44 pushes the legs 14 away from the snap position 30.

Instead of the variant with a U-shaped yoke spring shown in FIGS. 5 and 6, it is of course also possible to provide two individual springs on the base part side, each of which is opposite the legs 14.

In addition, the snap mechanism 29 of the embodiment of FIGS. 5 and 6 is also located in the at least one gap 16 between connecting part 6 and base part 2.

In the design of FIGS. 7 and 8 there are three snap positions 30. At each snap position 30 there is a spring arrangement 42 in the form of a resilient pressure piece 56, for example a ball pressure pin, which is at least partially embedded in the base part 2.

The snap mechanism 29 also has a latching projection 40, which is formed here by a clamping or yoke spring 44, which at least in sections embraces one of the legs 14 of the connecting part 6. The latching projection 40 is therefore resilient in this design. Alternatively, the latching projection 40 can also be rigid as in the embodiment of FIGS. 5 and 6, for example formed by a projection formed by leg 14. At the snap positions 30, the latching projection 40 moves over the spring arrangement 42 located at each snap position 30. Shortly before the snap positions 30 located along the pivoting movement 28 to the mounting plane 26, the connecting part 6 is braked, as in the design of FIGS. 1 to 4.

Of course, the resilient pressure piece 56 can also be arranged on the connecting part 6 opposite the base part 2 and the latching projections 40 on the base part 2. As a further alternative, instead of the resilient pressure pieces 56, solid latching projections formed from the base part 2, which are for example spherical, can also be provided. In this case the spring 44 is part of the spring arrangement 42.

In the embodiments of FIGS. 1 to 8, the spring arrangement 42 at the snap position is arranged essentially axially to the swivel axis 4 in relation to the at least one latching projection 40. In the embodiments of FIGS. 9 to 11, on the other hand, the spring arrangement 42 is essentially in the radial direction opposite the at least one latching projection. This makes it possible to arrange the snap mechanism 29 within the base part 2. The arrangement within the base part 2 protects the snap mechanism 29 from mechanical damage.

With the embodiment of FIG. 9, the spring arrangement 42 is arranged between the underside 58 of connecting part 6 facing the bearing surface 8 and the bearing surface 8. The spring arrangement 42 can be fitted between a lower part 60 of base part 2, e.g. the bush 22, and base part 2 in a loss-proof manner. In this configuration, the connecting part 6 has, for example, at its axle or its axle stub 15 at least one latching projection 40 projecting radially to the swivel axis 4, which interacts with the corresponding spring projection 46 at the snap position 30.

In order to create several snap positions 30 in this design along the pivoting movement 28, several radial latching projections 40 can be provided on the outer circumference of the axle stub 15 extending parallel to the swivel axis 4 in the direction around the swivel axis 4.

Here as well, a spring arrangement 42 can be provided instead of the latching projection 40 on the connecting part, which interacts with corresponding radially inwardly projecting latching projections 40 on the base part at the snap positions 30.

In FIG. 10, a resilient pressure piece 56 is inserted into the base part 2 as spring arrangement 42. The resilient pressure piece is aligned vertically or radially to the swivel axis 4.

In the embodiment of FIG. 11, the snap mechanism 29 has a friction element 62 which is located between the spring 44 and the latching projection 40. Due to the friction element 62, a spring projection 46 can be dispensed with, since an equally acting projection is formed by the friction element 62. The friction element 62, e.g. a ball, can be held in the spring arrangement 42 so that it cannot be lost. In contrast to the ball pressure pin 56 of FIG. 10 the spring 44 is a leaf spring. Here as well, several latching projections 40 can be present along the pivoting movement 28 around the swivel axis 4 in order to create several snap positions 30 along the pivoting movement 28.

REFERENCE NUMERALS 1 anchor device
2 base part
4 swivel axis
6 connecting part
8 bearing surface
10 object
12 opening
14 legs
15 axle or axle stub
16 gap
18 strut
20 axis of rotation
22 bush
24 pivot bearing
26 mounting plane
28 pivoting movement
29 snap mechanism
30 snap position
32 braking force
34 opening plane
36 acute angle
38 vertical position of the connecting part
40 latching projection
41 flank of the latching projection
42 spring arrangement
44 spring
46 projection of the spring arrangement
48 non-use position
50 fastener
52 pocket
54 upper part of bush
56 resilient pressure piece
58 underside of the connecting part
60 lower part of the base part
62 friction element

What is claimed is:

1. An anchor device (1) comprising:
a base part (2) for attachment to an object (10); and
a connecting part (6) which is held on the base part so as to be pivotable about a swivel axis (4) relative to the base part, wherein the base part has a bearing surface (8) for contact with the object and the connecting part has an opening (12) for fastening of a fastening, lifting, lashing or tensioning means, characterized in that a snap mechanism (29) is provided, which has at least one snap position (30) along a pivoting movement (28) of the connecting part (6) about the swivel axis (4) and which generates in a direction of the pivoting movement in front of the at least one snap position a braking force (32) directed against the pivoting movement, the braking force (32) being reduced in the direction of the pivoting movement behind the at least one snap position.

2. The anchor device (1) according to claim 1, characterized in that at the at least one snap position (30) the connecting part (6) is aligned substantially perpendicularly to the bearing surface (8).

3. The anchor device (1) according to claim 1, characterized in that the snap mechanism (29) has at least one section on a base part side and at least one section on a connecting part side.

4. The anchor device (1) according to claim 1, characterized in that the snap mechanism (29) is at least partially located in a gap (16) between the connecting part (6) and the base part (2).

5. The anchor device (1) according to claim 1, characterized in that in front of the at least one snap position (30) the braking force (32) against the pivoting movement (28)

increases at least in sections in the direction of the pivoting movement with decreasing distance from the snap position (30).

6. The anchor device (1) according to claim 1, characterized in that the snap mechanism (29) comprises a spring arrangement (42) which, when the at least one snap position (30) is reached by the connecting part (6), is deflected more strongly than when the connecting part (6) is spaced apart from the at least one snap position (30).

7. The anchor device (1) according to claim 6, characterized in that the spring arrangement (42) has at least one spring (44) which at least partially encompasses the base part (2) or the connecting part (6).

8. The anchor device (1) according to claim 6, characterized in that the spring arrangement (42) has a projection (46) projecting away from the base part (2) towards the connecting part (6) or away from the connecting part (6) towards the base part (2).

9. The anchor device (1) according to claim 8, characterized in that the snap mechanism (29) has at least one latching projection (40) which interacts with the spring arrangement (42) at least at the at least one snap position (30).

10. The anchor device (1) according to claim 9, characterized in that the at least one latching projection (40) is arranged on the connecting part (6).

11. The anchor device (1) according to claim 9, characterized in that a plurality of latching projections (40) is arranged around the swivel axis (4).

12. The anchor device (1) according to claim 9, characterized in that, at least at the at least one snap position (30), the at least one latching projection (40) and the projection (46) of the spring arrangement (42) lie against one another amidst deflection of at least the spring arrangement (42).

13. The anchor device (1) according to claim 6, characterized in that the snap mechanism (29) has at least one latching projection (40) which interacts with the spring arrangement (42) at least at the at least one snap position (30).

14. The anchor device (1) according to claim 13, characterized in that the at least one latching projection (40) is arranged on the connecting part (6).

15. The anchor device (1) according to claim 13, characterized in that a plurality of latching projections (40) is arranged around the swivel axis (4).

16. The anchor device (1) according to claim 1, characterized in that the connecting part (6) is aligned at an acute angle (36) or parallel to the bearing surface (8) at at least one further snap position (30) of the at least one snap position (30).

17. The anchor device (1) according to claim 16, characterised in that at the at least one further snap position (30) the connecting part (6) is held at least under its own weight at a distance from a mounting plane (26) spanned by the bearing surface (8).

18. The anchor device (1) according to claim 17, characterized in that a latching projection (40) is provided at the at least one further snap position (30), wherein flanks (41) of the latching projection (40) at the at least one further snap position (30) extend less steeply than flanks (41) of a latching projection (40) of a snap position of the at least one snap position (30) for the connecting part (6) located at or nearer to a vertical position of the connecting part (38).

19. The anchor device (1) according to claim 16, characterized in that a latching projection (40) is provided at the at least one further snap position (30), wherein flanks (41) of the latching projection (40) at the at least one further snap position (30) extend less steeply than flanks (41) of a latching projection (40) of a snap position of the at least one snap position (30) for the connecting part (6) located at or nearer to a vertical position of the connecting part (38).

* * * * *